United States Patent
Hertz et al.

(10) Patent No.: US 7,775,538 B1
(45) Date of Patent: Aug. 17, 2010

(54) PEDAL CAR

(76) Inventors: James D. Hertz, 9125 E. 138th St., Brighton, CO (US) 80602; Cindy Hertz, 9125 E. 138th St., Brighton, CO (US) 80602

(*) Notice: Subject to any disclaimer, the term of this patent is extended or adjusted under 35 U.S.C. 154(b) by 244 days.

(21) Appl. No.: 12/122,106

(22) Filed: May 16, 2008

(51) Int. Cl.
*B62J 17/00* (2006.01)
*B62K 5/08* (2006.01)

(52) U.S. Cl. .................. 280/282; 280/212; 280/267

(58) Field of Classification Search ........... 280/282, 280/209, 212, 214, 215, 216, 230, 231, 259–261, 280/267, DIG. 5
See application file for complete search history.

(56) References Cited

U.S. PATENT DOCUMENTS

| | | | | |
|---|---|---|---|---|
| 1,093,729 A | * | 4/1914 | Ruff | 474/150 |
| 1,937,245 A | * | 11/1933 | Porter | 280/250 |
| 3,664,684 A | * | 5/1972 | Long | 280/231 |
| 4,070,032 A | * | 1/1978 | Cunningham | 280/231 |
| 4,088,882 A | * | 5/1978 | Lewis | 362/217.08 |
| 4,227,589 A | * | 10/1980 | Chika | 180/206 |
| 4,313,517 A | * | 2/1982 | Pivar | 180/216 |
| 4,410,198 A | | 10/1983 | Fernandes et al. | |
| D275,381 S | | 9/1984 | Fernandes et al. | |
| 4,546,992 A | * | 10/1985 | Swartz et al. | 280/282 |
| 4,674,762 A | | 6/1987 | Nelson et al. | |
| 4,875,699 A | | 10/1989 | Levavi | |
| 5,242,181 A | | 9/1993 | Fales et al. | |
| 5,326,121 A | * | 7/1994 | Fisher | 280/282 |
| 5,826,897 A | | 10/1998 | Beard | |
| 6,247,714 B1 | * | 6/2001 | Rasmussen et al. | 280/231 |
| D485,514 S | | 1/2004 | Berg | |
| 6,953,203 B2 | | 10/2005 | Wilcox et al. | |

* cited by examiner

*Primary Examiner*—Anne Marie M Boehler
(74) *Attorney, Agent, or Firm*—Crossley Patent Law; Mark A. Crossley (57) ABSTRACT

A pedal car that is designed to serve as foot-propelled transportation for two or more individuals. The pedal car has a protected enclosure that is designed to be powered by leg power of the two front-seat passengers, with these passengers operating a pedaling system. Each of these two front-seat passengers has a two-pedal system to allow each of them to share the responsibility of providing power to the pedal car. The pedal car also has an overhead roof, with each of the two front seats having 90-degree swivel capabilities, a seat lock, and a seat belt for safety while riding.

2 Claims, 8 Drawing Sheets

PEDAL CAR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved pedal car that is designed to serve as foot-propelled transportation for two or more individuals.

SUMMARY OF THE INVENTION

The present invention concerns that of a new and improved pedal car that is designed to serve as foot-propelled transportation for two or more individuals. The pedal car has a protected enclosure that is designed to be powered by leg power of the two front-seat passengers, with these passengers operating a pedaling system. Each of these two front-seat passengers has a two-pedal system to allow each of them to share the responsibility of providing power to the pedal car. The pedal car also has an overhead roof, with each of the two front seats having 90-degree swivel capabilities, a seat lock, and a seat belt for safety while riding.

There has thus been outlined, rather broadly, the more important features of a pedal car that the detailed description thereof that follows may be better understood and in order that the present contribution to the art may be better appreciated. There are, of course, additional features of the pedal car that will be described hereinafter and which will form the subject matter of the claims appended hereto.

In this respect, before explaining at least one embodiment of the pedal car in detail, it is to be understood that the pedal car is not limited in its application to the details of construction and to the arrangements of the components set forth in the following description or illustrated in the drawings. The pedal car is capable of other embodiments and being practiced and carried out in various ways. Also, to it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several is purposes of the present pedal car. It is important, therefore, that the claims be regarded as including such equivalent constructions insofar as they do not depart from the spirit and scope of the present invention.

It is therefore an object of the present invention to provide a pedal car which has all of the advantages of the prior art and none of the disadvantages.

It is another object of the present invention to provide a pedal car which may be easily and efficiently manufactured and marketed.

It is another object of the present invention to provide a pedal car which is of durable and reliable construction.

It is yet another object of the present invention to provide a pedal car which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

With reference now to the drawings, and in particular to FIGS. 1 through 8 thereof, a pedal car embodying the principles and concepts of the present invention and generally designated by the reference numeral 2 will be described. As best illustrated in FIGS. 1 through 8, the pedal car 2 comprises a main body 4, with the main body 4 having a removable top 6. The main body 4 preferably has a rectangular-based shape. The main body 4 has two ends comprising a front end 70 and a rear end 72 and also has two sides comprising a left side 74 and a right side 76. Furthermore, the main body 4 has two surfaces comprising a top surface 78 and a bottom surface 80.

A pair of front wheels comprising left front wheel 8 and right front wheel 10 and a pair of rear wheels comprising a left rear wheel 12 and a right rear wheel 14 are associated with the body 4 of the vehicle. Left front wheel 8 and right to front wheel 10 are axially attached to one another via a front axle 40, while the left rear wheel 12 and right rear wheel 14 are axially attached to one another via a rear axle 41. All four wheels are associated with a suspension 16 that is attached to the main body 4, with axles 40 and 41 being attached to the suspension 16.

Within the main body 4 of the pedal car 2 are attached a front driver seat 18 and a front passenger seat 20, which are both axially attached to the main body 4. A center consul 22 is attached to the main body 4 in between these two seats, with the center consul having at least one drink holder 24. A steering wheel 26 is attached to the main body 4 of the pedal car 2 and is located immediately in front of the front driver seat 18. The steering wheel 26 is attached to a steering control box 28, located underneath the main body 4 of the pedal car 2, through a steering rod 30. The steering control box 28, in turn, is connected to a control rod 31 that is connected to the suspension 16 of the pedal car 2. When the steering wheel 26 is rotated left or right, this causes a chain of events to occur that eventually cause the control rod 31 to rotate, thereby causing the front wheels 8 and 10 to rotate, thereby propelling the vehicle.

The pedal car 2 also includes a pair of pedals 32 and 34 that are axially attached to a pedal gear box 36. The pedals 32 and 34, within the main body 4 of the pedal car 2, are positioned such that they are located immediately in front of an individual who would be sitting in the front driver seat 18. Operation of the pedals 32 and 34 is necessary to move the pedal car 2 in a forward direction.

Figure 1:
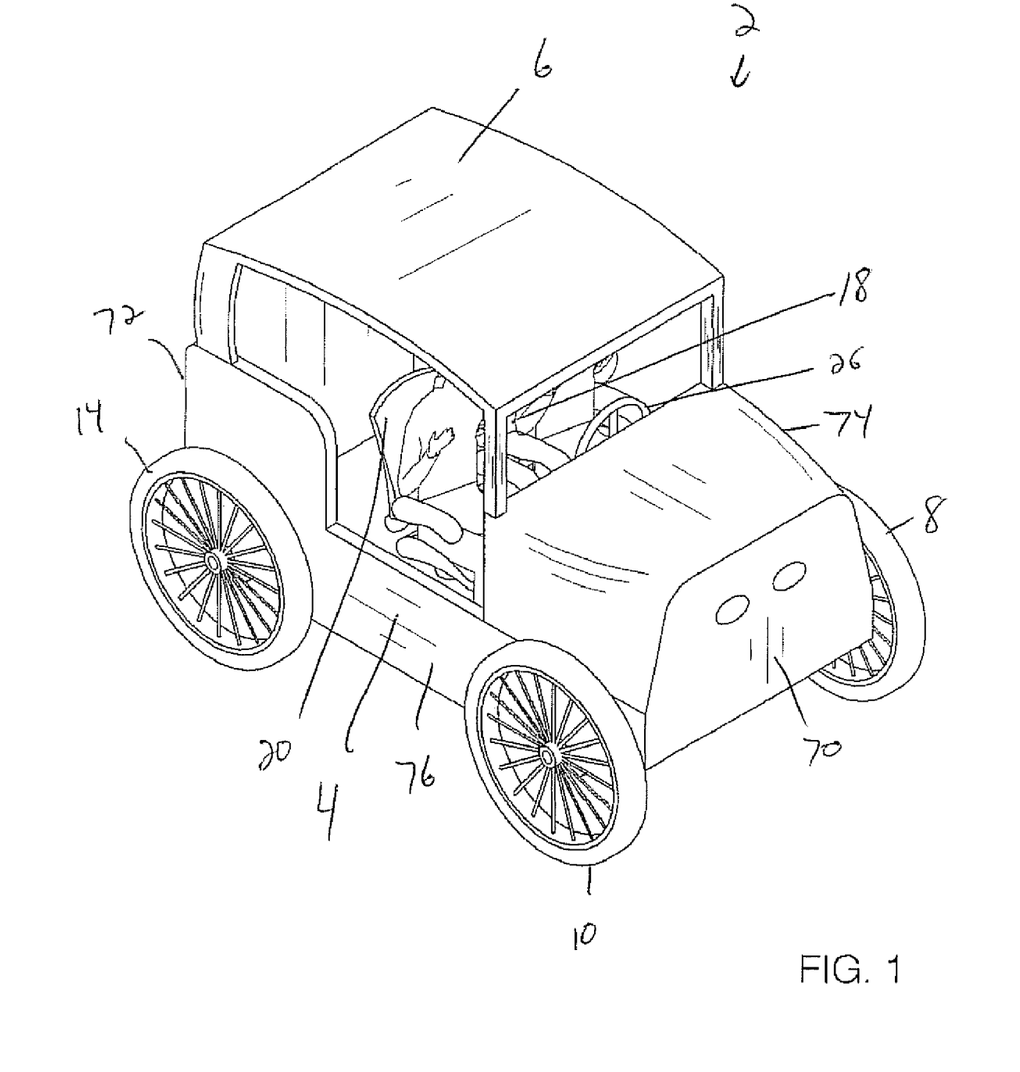
FIG. 1 shows a top perspective view of the pedal car.
Figure 2:
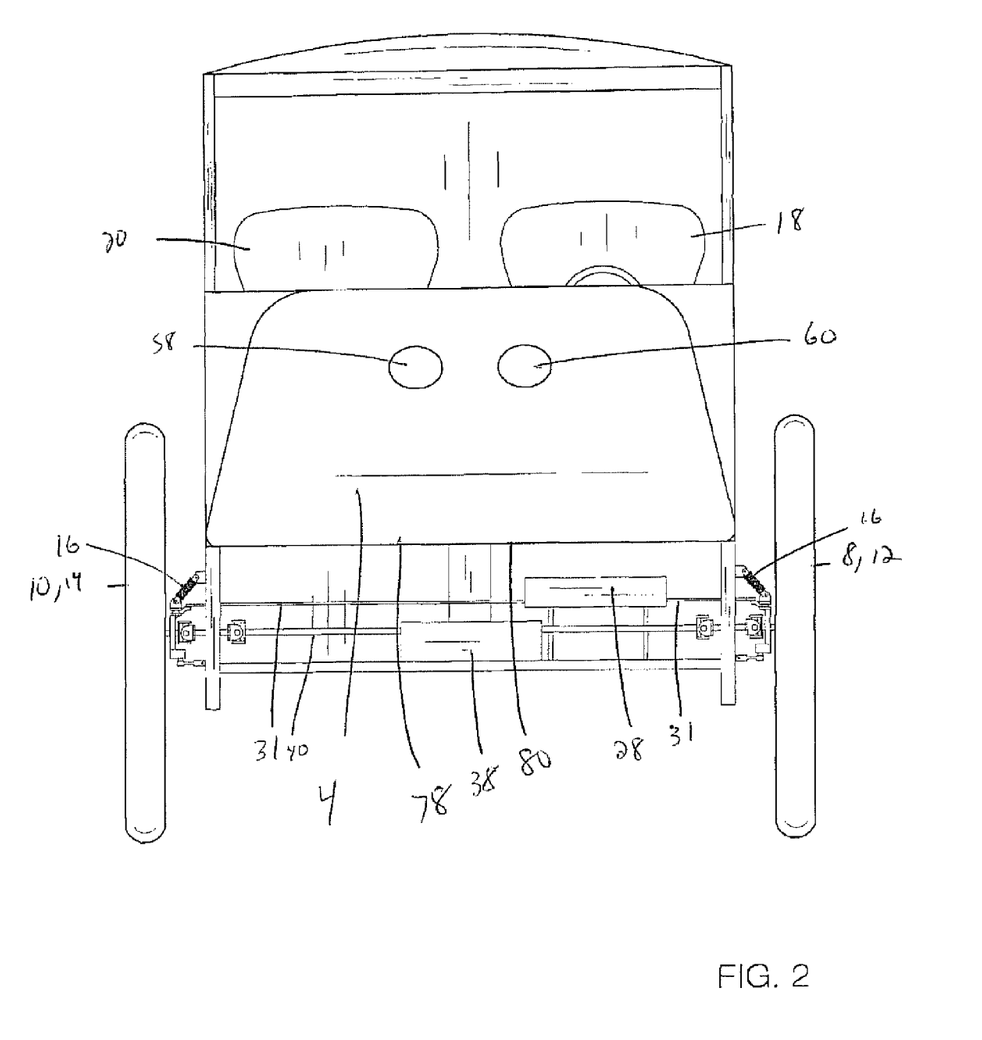
FIG. 2 shows a front view of the pedal car.
Figure 3:
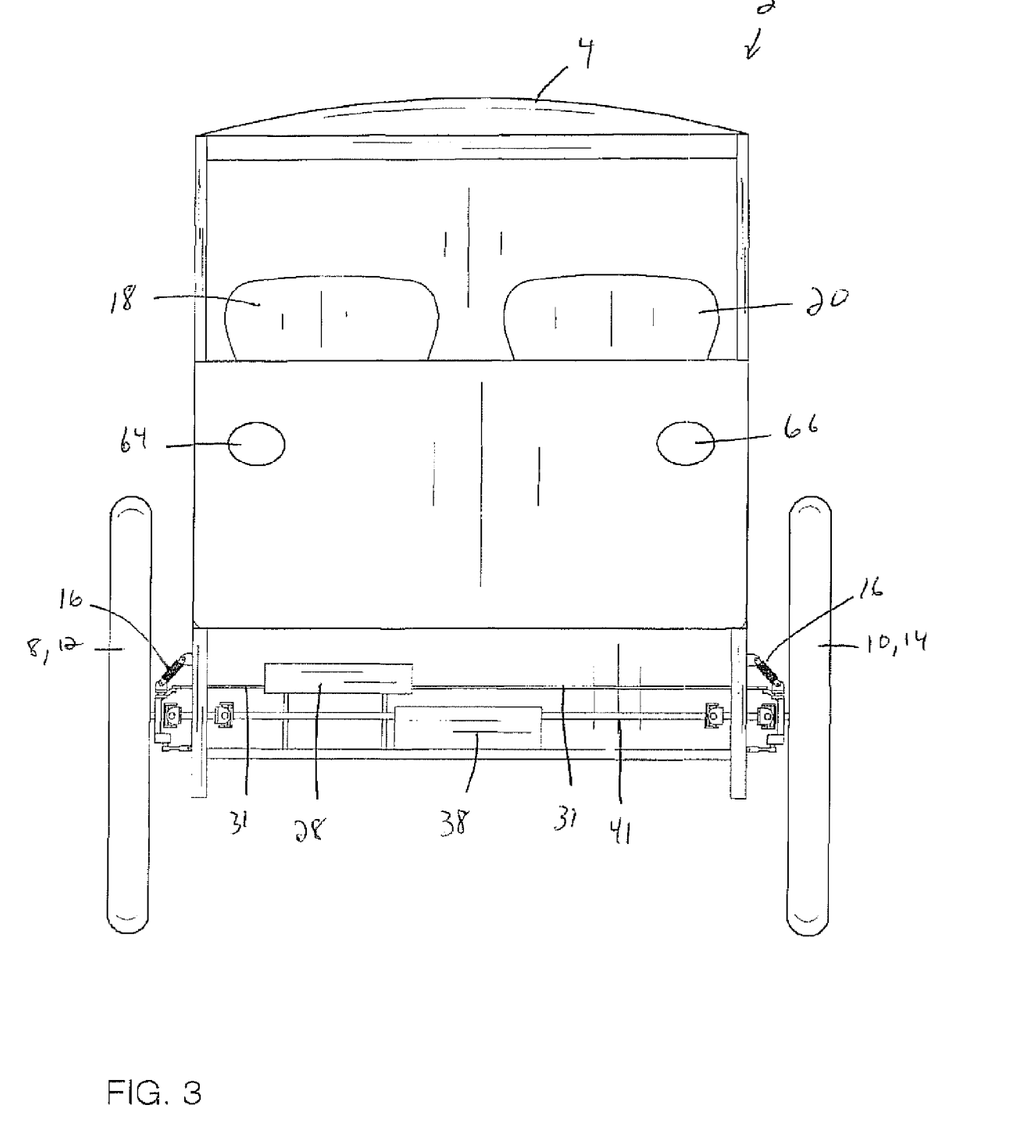
FIG. 3 shows a rear view of the pedal car.
Figure 4:
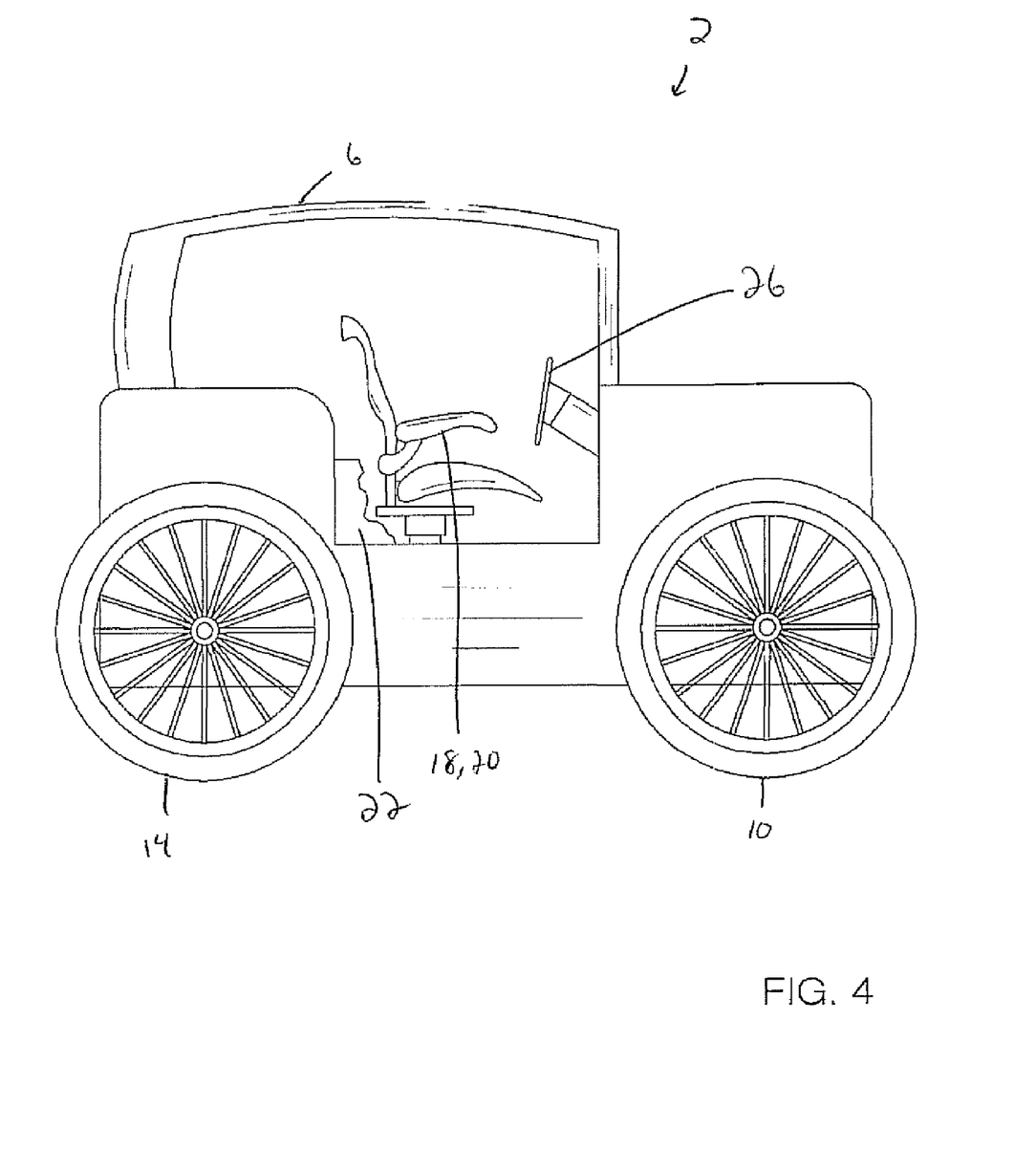
FIG. 4 shows a passenger side view of the pedal car.
Figure 5:
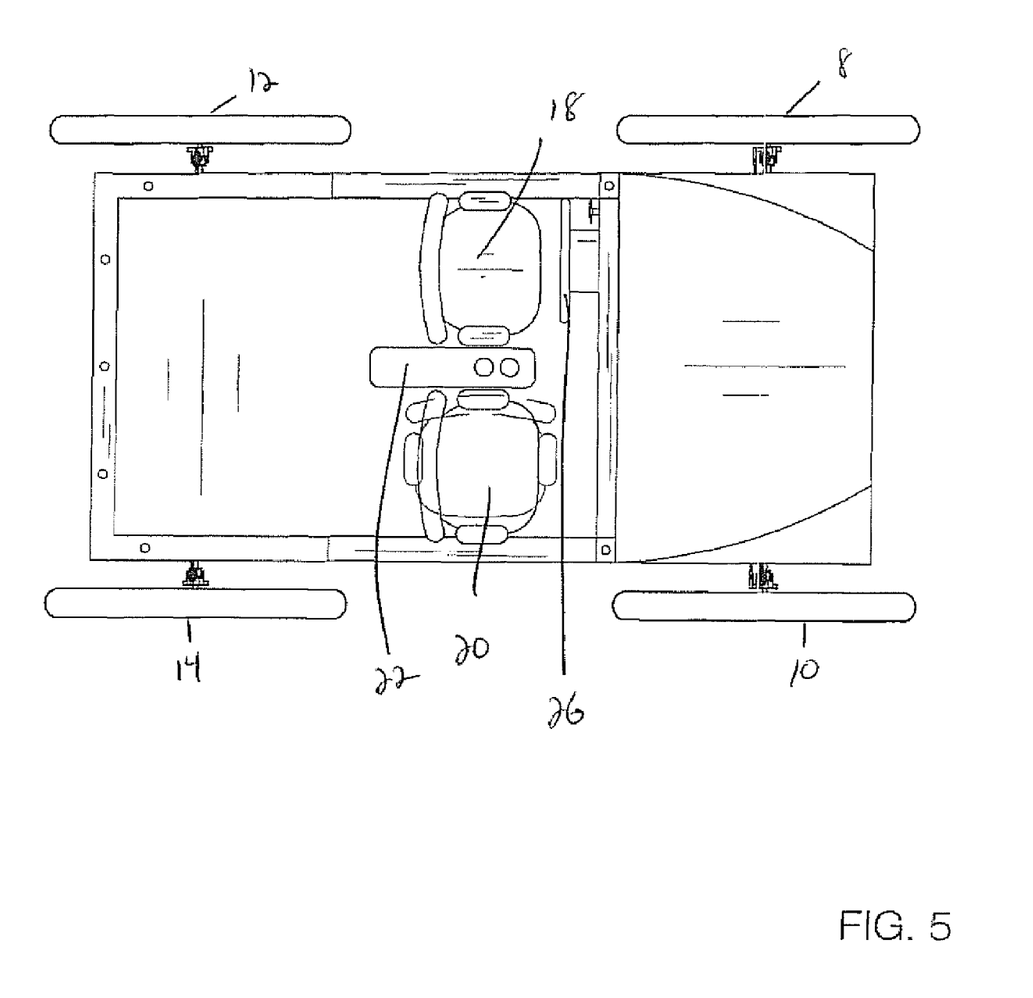
FIG. 5 shows a top cutaway view of the pedal car.
Figure 6:
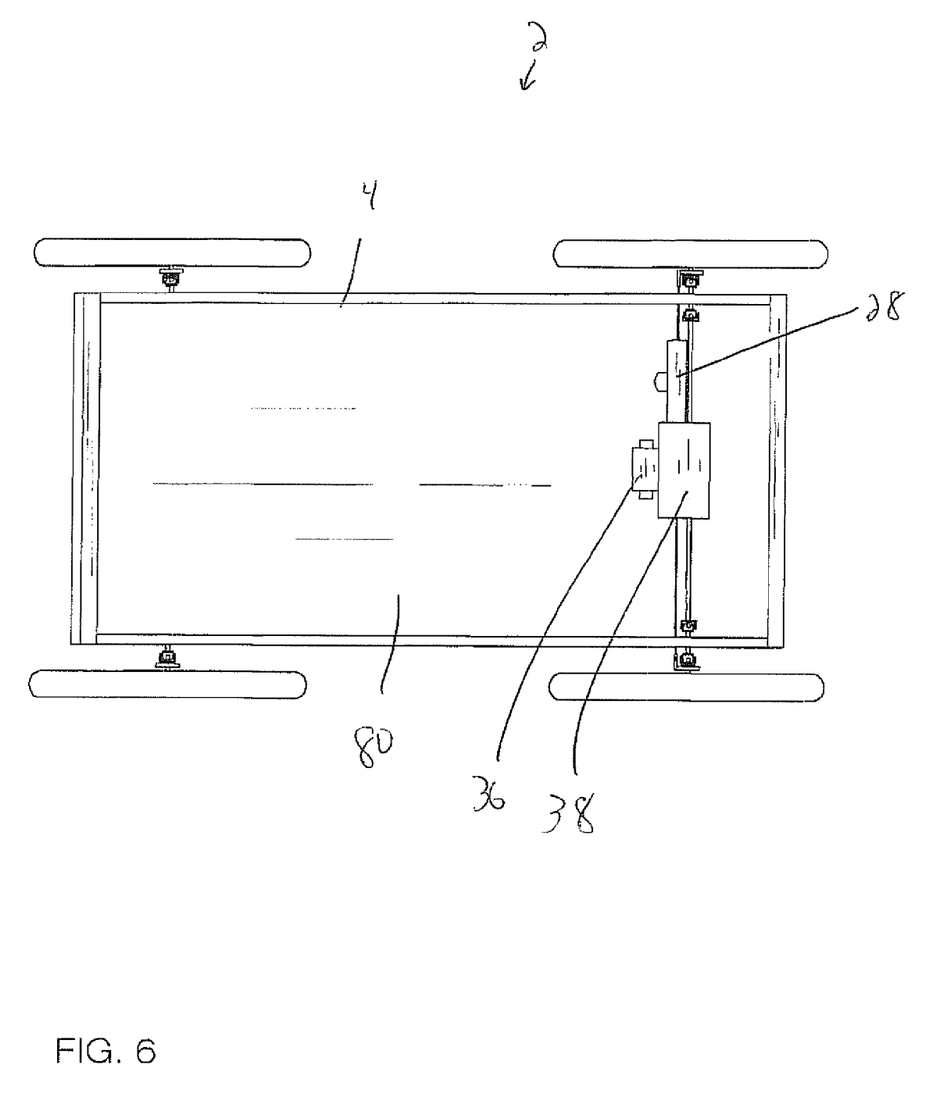
FIG. 6 shows a bottom view of the pedal car.
Figure 7:
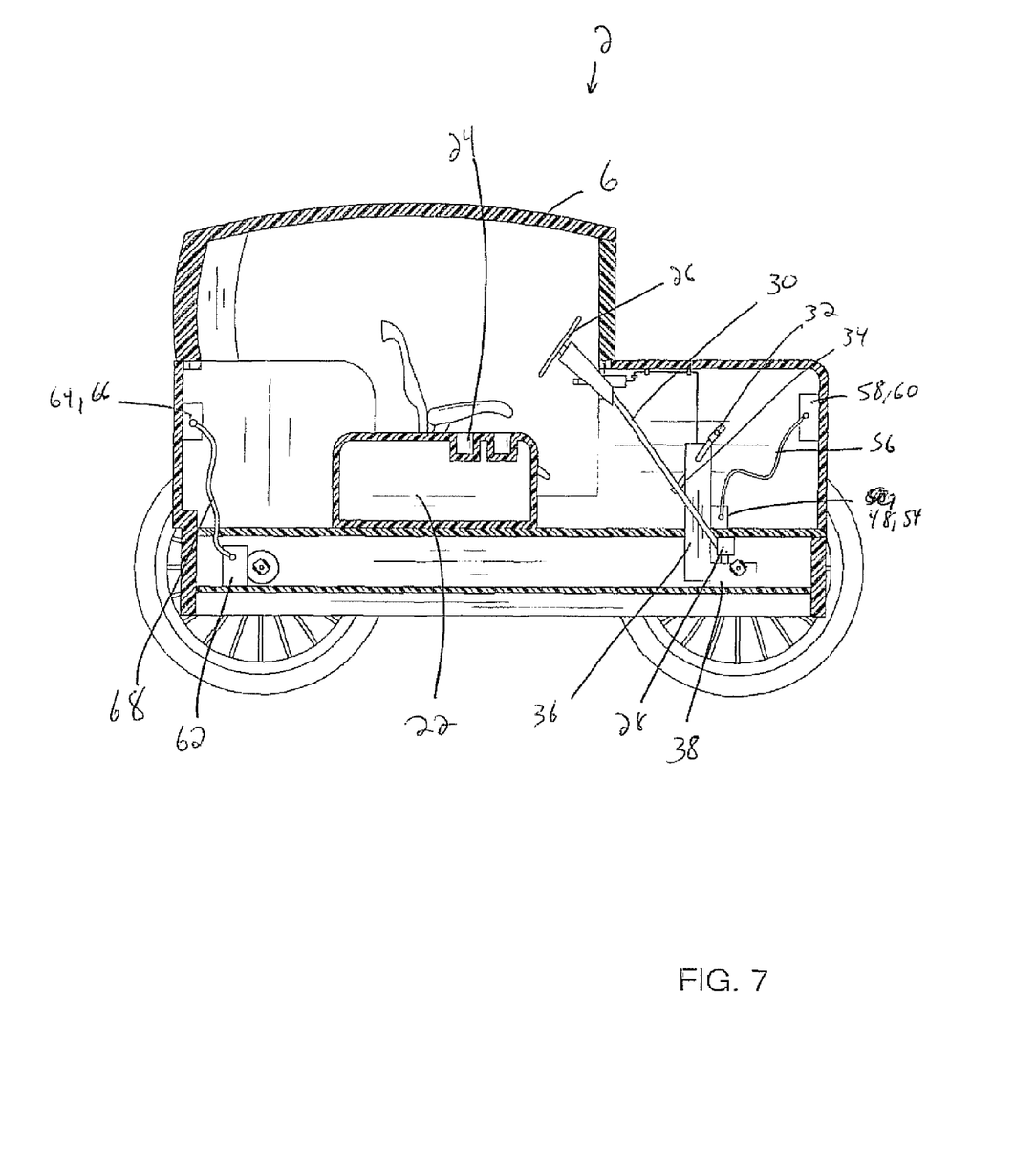
FIG. 7 shows a passenger side cutaway view of the pedal car.
Figure 8:
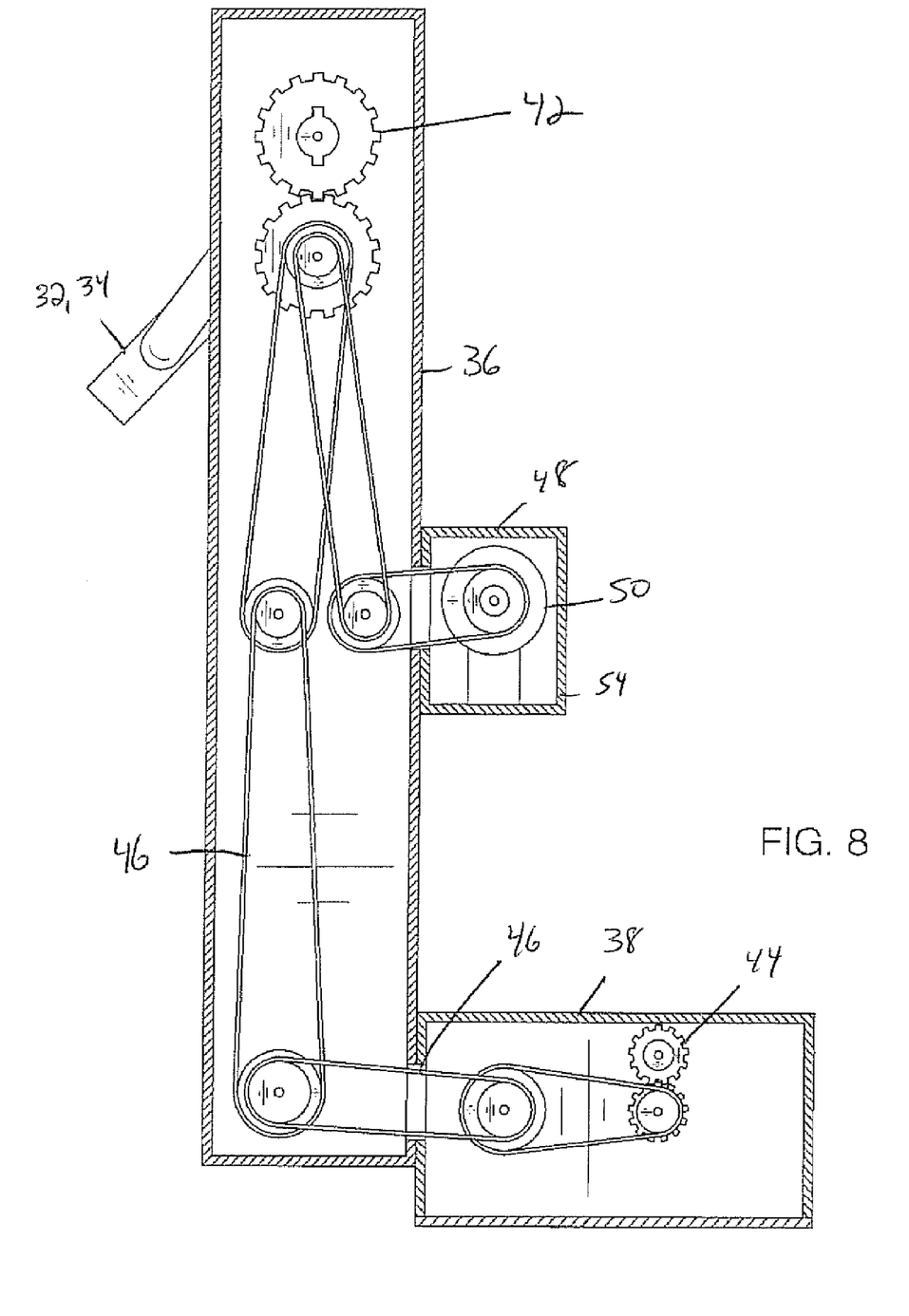
FIG. 8 shows a view of the gear system used with the pedal car.

The pedal gear box 36 is attached to a gear housing box 38, which is axially connected to front axle 40. Left front wheel 8 and right front wheel 10 are also connected to front axle 40. When an individual operates the pedals 32 and 34, various gears 42 within the pedal gear box 36 are connected to various gears 44 within the gear housing box 38 through a plurality of belts 46. The gears 44 within the gear housing box 38 are connected to the front axle 40, providing power to the pedal car 2.

A front alternator box 48 is attached to the gear housing box 38, with the front alternator box 48 having a series of gears 50 located within it. At least one belt 52 is attached to the gears 50 within the front alternator box 48 and the gears 44 within the pedal gear box 36. Gears 50 are attached to a storage unit 54, with the storage unit 54 designed to be capable of storing an amount of electricity. Storage unit 54 is connected via cable 56 to a pair of front headlights 58 and 60 that are mounted on the front end 70 of the main body 4 of the pedal car 2.

A rear alternator box 62 is connected to the rear axle 41 of the pedal car 2, with the rear alternator box 62 being attached to a pair of rear taillights 64 and 66 via a cable 68. The rear alternator box 62 stores power within a storage unit 63 located within the rear alternator box 62 and transfers this power to the taillights 64 and 66, which are attached to the rear end 72 of the main body 4.

With respect to the above description then, it is to be realized that the optimum dimensional relationships for the parts of the invention, to include variations in size, materials, shape, form, function and manner of operation, assembly and use, are deemed readily apparent and obvious to one skilled in the to art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A pedal car comprising
a main body, the main body having two ends comprising a front end and a rear end, the main body also having two sides comprising a left side and a right side, the main body also having two surfaces comprising a top surface and a bottom surface,
non-motorized means for propelling the main body of the pedal car,
means for steering the pedal car,
a removable top attached to the main body,
wherein the non-motorized means for propelling the main body of the pedal car further comprises
   a suspension attached to the main body of the pedal car,
   a pair of axles comprising a front axle and a rear axle, wherein each of the axles of the pair of axles is attached to the suspension,
   a pair of front wheels comprising a left front wheel and a right front wheel, wherein each of the front wheels of the pair of front wheels is attached to the front axle,
   a pair of rear wheels comprising a left rear wheel and a right rear wheel, wherein each of the rear wheels of the pair of rear wheels is attached to the rear axle,
   means for propelling the wheels attached to the front axle in a forward direction,
wherein the means for propelling the wheels attached to the pair of axles in a forward direction further comprises
   a pair of pedals located within the main body,
   a pedal gear box, the pedal gear box including a plurality of internal gears, wherein the pair of pedals are attached to the pedal gear box,
   a gear housing box, the gear housing box including a plurality of internal gears, wherein the pedal gear box is attached to the gear housing box, further wherein the gears located within the gear housing box are connected to the front axle of the pair of axles,
   wherein operating the pair of pedals causes the front axle to rotate, thereby moving the pedal car,
wherein means for steering the pedal car further comprises
   a steering control box located underneath the main body,
   a steering wheel connected to the steering control box,
   a control rod, the control rod being connected to the steering control box, the control rod also being connected to the suspension,
   whereby rotating the steering wheel causes the front wheels of the pedal car to rotate,
a pair of passenger seats comprising a front driver seat and a front passenger seat, wherein both of the passenger seats are attached to the main body,
a center console attached to the main body of the pedal car, the center console being located in between the front driver seat and the front passenger seat,
a pair of front headlights attached to the front end of the main body,
means for providing power to the pair of front headlights,
a pair of rear headlights attached to the rear end of the main body,
means for providing power to the pair of rear headlights,
wherein the means for providing power to the pair of front headlights further comprises
   a front alternator box attached to the gear housing box,
   a plurality of gears located within the front alternator box,
   a storage unit located within the front alternator box,
   wherein the storage unit is capable of storing power,
   further wherein the storage unit is connected to the pair of front headlights,
wherein the means for providing power to the pair of rear headlights further comprises
a rear alternator box attached to the rear axle,
a storage unit located within the rear alternator box,
wherein the storage unit in the rear alternator box is capable of storing power,
further wherein the storage unit in the rear alternator box is connected to the pair of rear headlights.

2. A pedal car comprising
(a) a main body, the main body having two ends comprising a front end and a rear end, the main body also having two sides comprising a left side and a right side, the main body also having two surfaces comprising a top surface and a bottom surface,
(b) non-motorized means for propelling the main body of the pedal car, said non-motorized means for propelling the main body of the pedal car further comprising (i) a suspension attached to the main body of the pedal car, (ii) a pair of axles comprising a front axle and a rear axle, wherein each of the axles of the pair of axles is attached to the suspension, (iii) a pair of front wheels comprising a left front wheel and a right front wheel, wherein each of the front wheels of the pair of front wheels is attached to the front axle, (iv) a pair of rear wheels comprising a left rear wheel and a right rear wheel, wherein each of the rear wheels of the pair of rear wheels is attached to the rear axle, and (v) means for propelling the wheels attached to the front axle in a forward direction, said means further comprising (1) a pair of pedals located within the main body, (2) a pedal gear box, the pedal gear box including a plurality of internal gears, wherein the pair of pedals are attached to the pedal gear box, (3) a gear housing box, the gear housing box including a plurality of internal gears, wherein the pedal gear box is attached to the gear housing box, further wherein the gears located within the gear housing box are connected to the front axle of the pair of axles, (4) wherein operating the pair of pedals causes the front axle to rotate, thereby moving the pedal car, (c) means for steering the pedal car, said means further comprising (i) a steering control box located underneath the main body, (ii) a steering wheel connected to the steering control box, (iii) a control rod, the control rod being connected to the steering control box, the control rod also being connected to the suspension, (iv) whereby rotating the steering wheel causes the front wheels of the pedal car to rotate, (d) a removable top attached to the main body, (e) a pair of passenger seats comprising a front driver seat and a front passenger seat, wherein both of the passenger seats are attached to the main body, (f) a center console attached to the main body of the pedal car, the center console being located in between the front driver seat and the front passenger seat, (g) a pair of front headlights attached to the front end of the main body, (h) means for providing power to the pair of front headlights, said means further comprising (i) a front alternator box attached to the gear housing box, (ii) a plurality of gears located within the front alternator box, (iii) a storage unit located within the front alternator box, (iv) wherein the storage unit is capable of storing power, (v) further wherein the storage unit is connected to the pair of front headlights, (i) a pair of rear headlights attached to the rear end of the main body, and (j) means for providing power to the pair of rear headlights, said means further comprising (i) a rear alternator box attached to the rear axle, (ii) a storage unit located within the rear alternator box, (iii) wherein the storage unit in the rear alternator box is capable of storing power, (iv) further wherein the storage unit in the rear alternator box is connected to the pair of rear headlights.

\* \* \* \* \*